United States Patent [19]
Gould, III et al.

[11] 3,835,569
[45] Sept. 17, 1974

[54] FIBER REINFORCED RESIN FISHING ROD

[75] Inventors: Jay W. Gould, III, Bloomington, Minn.; Phillip William Phillipson, Denver, Colo.

[73] Assignee: Minnesota Mining and Manufacturing Company, St. Paul, Minn.

[22] Filed: Nov. 9, 1973

[21] Appl. No.: 414,269

[52] U.S. Cl. ............................................. 43/18 GF
[51] Int. Cl. ............................................. A01k 87/02
[58] Field of Search ............ 43/18, 18 GF; 403/222, 403/223, 225, 291

[56] References Cited
UNITED STATES PATENTS
3,152,820  10/1964  Giampa et al. .................... 43/18 GF
3,469,338  9/1969  Hills ................................ 43/18 GF
FOREIGN PATENTS OR APPLICATIONS
1,186,861  4/1970  Great Britain .................... 43/18 GF Primary Examiner—Warner H. Camp
Attorney, Agent, or Firm—Alexander, Sell, Steldt & DeLaHunt

[57] ABSTRACT

A hollow two-piece fiberglass fishing rod having a tubular fiberglass ferrule in which resilient, shock absorbing, strongly fiberglass adherent adhesive plugs bond themselves to the interior of and fill the ends of the butt section that fits into the ferrule and the tip section adjacent the ferrule. The end of the butt section within the ferrule is protected against the severe stresses of casting and playing fish by the adhesive plug therein and the butt section and tip section are firmly held together aided by a partial vacuum created in the ferrule between the two adhesive plugs when there is any relative movement tending to pull the rod sections apart.

2 Claims, 2 Drawing Figures

PATENTED SEP 17 1974  3,835,569

FIBER REINFORCED RESIN FISHING ROD

FIELD OF THE INVENTION

The present invention relates to a fiber reinforced resin fishing rod having a hollow tubular butt section and a hollow tubular tip section in which the tip section includes a tubular fiberglass ferrule for joining the butt section and the tip section.

BACKGROUND OF THE INVENTION

Nearly all of the fishing rods sold today are made from fiberglass reinforced plastic and they are generally referred to simply as fiberglass rods. Perhaps 90 percent of the fiberglass rods are tapered, tubular and hollow. Variations in the "action" of the rod are achieved by differences in the diameter of the tube and of the wall thickness. And, nearly all rods are made of more than one piece for ease of storage and transport, the majority being made of two pieces. In two piece rods, the smaller diameter portion is called the tip section and the larger diameter portion is called the butt section, the two sections in use being joined by a ferrule.

There are four types of ferrules in general use: The metal ferrule, the blank-over-blank ferrule, the solid glass ferrule, and the tubular glass ferrule. The metal ferrule consists of mating male and female metal portions which are bonded to the adjacent ends of the butt and tip sections. The blank-over-blank ferrule requires two rod blanks (i.e. tapered hollow tubular fiberglass portions) that have matching tapers at the ends that are to fit together. The solid glass ferrule consists of a short tapered tubular fiberglass portion that is bonded into the end of the butt section and fits into the end of the tip section. The tubular glass ferrule usually consists of a hollow tapered tubular fiberglass portion bonded onto the end of the tip section into which the butt section fits but it may also be formed at the end of the tip section during the formation of the tip section. The tubular fiberglass ferrule is often preferred because it is relatively inexpensive in production and because, unlike the metal ferrule, it permits bending along its length contributing to the action of the rod rather than simply producing a dead spot in the rod.

It has been found that when a tubular fiberglass ferrule is used the end of the butt section within the ferrule takes a terrific pounding because the force is exerted across its diameter, and to compound the stress, the ferrule must bend the butt section. The impulse that bends a rod butt in casting is the momentum of the moving tip and the lure; when a cast is checked, this momentum travels down the rod to the butt by way of the ferrule. Without any protection of the end of the butt section within the ferrule the forces developed will eventually crush it; and, during casting an objectionable clicking sound may well emanate from the ferrule.

Prior art fishing rods have included an essentially rigid adhesive plug or a preformed resilient cylindrical plug cemented in the end of the butt section within the ferrule in an attempt to overcome these problems. It has, however, been found that both the rigid adhesive plug and the cemented resilient cylindrical plug break loose from the interior wall of the butt section under the stress of use. A loose rigid adhesive plug will slide down the butt section and a loose resilient cylindrical plug will be ejected from the butt section and they are thereafter useless.

SUMMARY OF THE INVENTION

The present invention provides an improved fiber reinforced resin fishing rod having a hollow tubular butt section and a hollow tubular tip section, in which the tip section includes a tubular fiberglass ferrule for joining the butt section and the tip section. The improvement comprises a resilient, shock absorbing, strongly fiberglass adherent adhesive plug bonding itself to the interior wall and filling the end of the butt section that fits into the ferrule and an adhesive plug bonding itself to the interior wall and filling the end of the tip section adjacent the ferrule.

When the fishing rod of the present invention is assembled and in use the end of the butt section within the ferrule is protected against the severe stresses of casting and playing fish by the adhesive plug therein. Additionally, the butt section and tip section are firmly held together aided by a partial vacuum created in the ferrule between the two adhesive plugs when there is any relative movement tending to pull the rod sections apart.

IN THE DRAWING

In the drawing:

FIG. 1 is a longitudinal view of a fiberglass fishing rod constructed in accordance with the present invention; and FIG. 2 is a longitudinal view partially in section of the ferrule area of the fishing rod of FIG. 1.

DESCRIPTION OF THE PREFERRED EMBODIMENT

Figure 1:
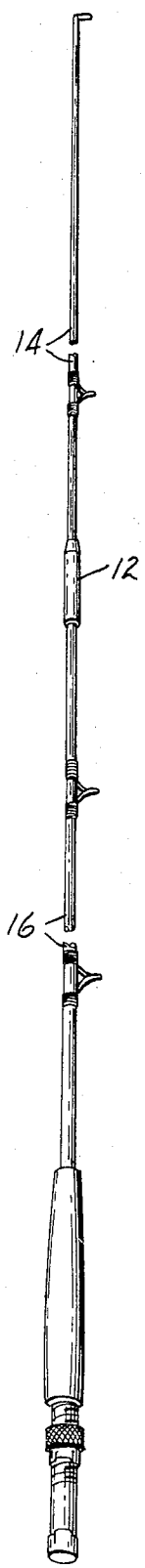
Figure 2:
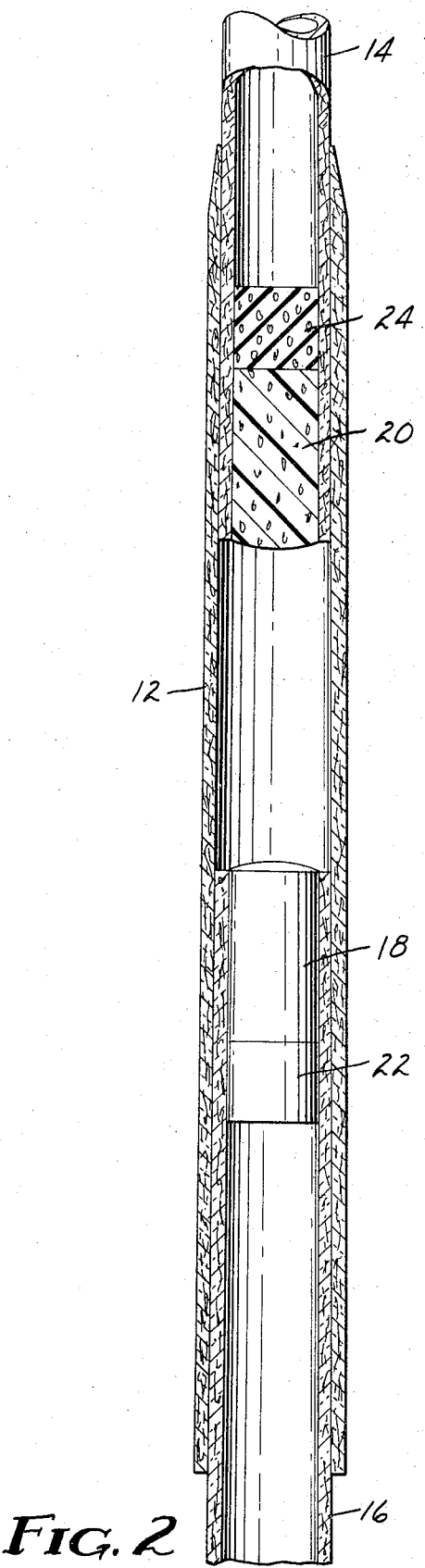

The illustrated fiber reinforced resin fishing rod is a two-piece fiberglass fishing rod of the fly casting type in which the tubular glass ferrule 12 consists of a hollow tapered tubular fiberglass portion bonded onto the end of the tip section 14 into which the butt section 16 fits. However, it is to be understood that within the scope of the present invention the rod may also be of any other fiber reinforced resin appropriate to fishing rods, it may be of the bait casting or spinning type and the tubular glass ferrule may be formed at the end of the tip section during the formation of the tip section. The rod also may consist of more than two pieces in which case the present invention may be used to advantage at each ferrule; a two-piece rod being referred to herein simply for convenience of terminology.

A resilient, shock-absorbing, strongly fiberglass adhesive plug 18 bonds itself to the interior wall of and fills the end of the hollow tubular butt section 16 that fits into the ferrule 12. The plug 18 remains securely in place even under the stresses of casting and playing fish due to its resiliency and its strongly fiberglass adherent nature and its shock-absorbing character protects the end of the butt section 16 within the ferrule 12 from those stresses. In assembly of the rod a highly compressible foam stopper 22 is inserted into the butt section a predetermined distance from the end thereof and the adhesive 18 is injected into the end of the butt section and bonds itself to the interior wall of the butt section 16 as it sets up.

An adhesive plug 20 bonds itself to the interior wall of and fills the end of the hollow tubular tip section 14 adjacent the ferrule 12. When the tubular glass ferrule is of the type shown consisting of a hollow tapered tubular fiberglass portion 12 bonded onto the end of the tip section 14 it is preferred that the adhesive plug 20 in the end of the tip section 14 also be resilient, shock-absorbing, and strongly fiberglass adherent to protect the end of the tip section 14 in which destructive stresses of a lower magnitude than those developed in the butt section are developed during casting and playing fish. As in the assembly of the butt section, a highly compressible foam stopper 24 is inserted into the end of the tip section during assembly and the adhesive 20 is injected to fill the space from the stopper to the end of the tip section, the adhesive bonding itself to the interior wall of the tip section as it sets up.

When the rod sections are put together as illustrated in the drawing the tip section 14 and the butt section 16 are spaced within the ferrule 10 as is usual, the butt section 16 fitting snugly within the ferrule due to the matching of their tapers. The butt section 16 and the tip section 14 are thus firmly held together aided by a partial vacuum created in the ferrule 10 between the two adhesive plugs 18 and 20 when there is any relative movement tending to pull the rod sections apart.

In one specific embodiment of the present invention a two-piece fishing rod of the type illustrated in the drawing was constructed. The tip section 14, the butt section 16 and the ferrule 12 were fabricated with matching tapers within 0.5 mil tolerance and with about a 3 mil per inch taper. Compressible urethane foam stoppers 22 and 24 were inserted into the ends of the tip section 14 and the butt section 16 spaced about 0.5 inch from the respective ends of the sections. A flexible polyamide hot melt adhesive available as X3726 from the Minnesota Mining and Manufacturing Co. with offices at Saint Paul, Minn. was injected into the ends of the tip section and the butt section to fill the ends thereof from the respective stoppers 24 and 22. The hollow tapered fiberglass portion 12 forming the ferrule was then bonded onto the end of the tip section 14. Testing of the assembled rod showed that the adhesive plugs 18 and 20 did not break loose in the normal casting action, that the ends of the tip section 14 and the butt section 16 within the ferrule 10 were indeed protected and that a vacuum fit within the ferrule previously not available in hollow fiberglass fishing rods was attained.

We claim:

1. In a fiber reinforced resin fishing rod having a hollow tubular butt section and a hollow tubular tip section, in which the tip section includes a tubular fiberglass ferrule for joining the butt section and the tip section, the improvement comprising:

a resilient, shock absorbing, strongly fiberglass adherent adhesive plug bonding itself to the interior wall and filling the end of the butt section that fits into the ferrule, and an adhesive plug bonding itself to the interior wall of and filling the end of the tip section adjacent the ferrule, whereby when the fishing rod is assembled and in use the end of the butt section within the ferrule is protected against the severe stresses of casting and playing fish by the adhesive plug therein and the butt section and tip section are firmly held together aided by a partial vacuum created in the ferrule between the two adhesive plugs when there is any relative movement tending to pull the rod sections apart.

2. The fiber reinforced resin fishing rod of claim 1 wherein said tubular fiberglass ferrule comprises a hollow tapered tubular fiberglass portion bonded onto the end of said tip section and wherein said adhesive plug filling the end of said tip section is resilient, shock-absorbing, and strongly fiberglass adherent.

* * * * *